Figure 1:
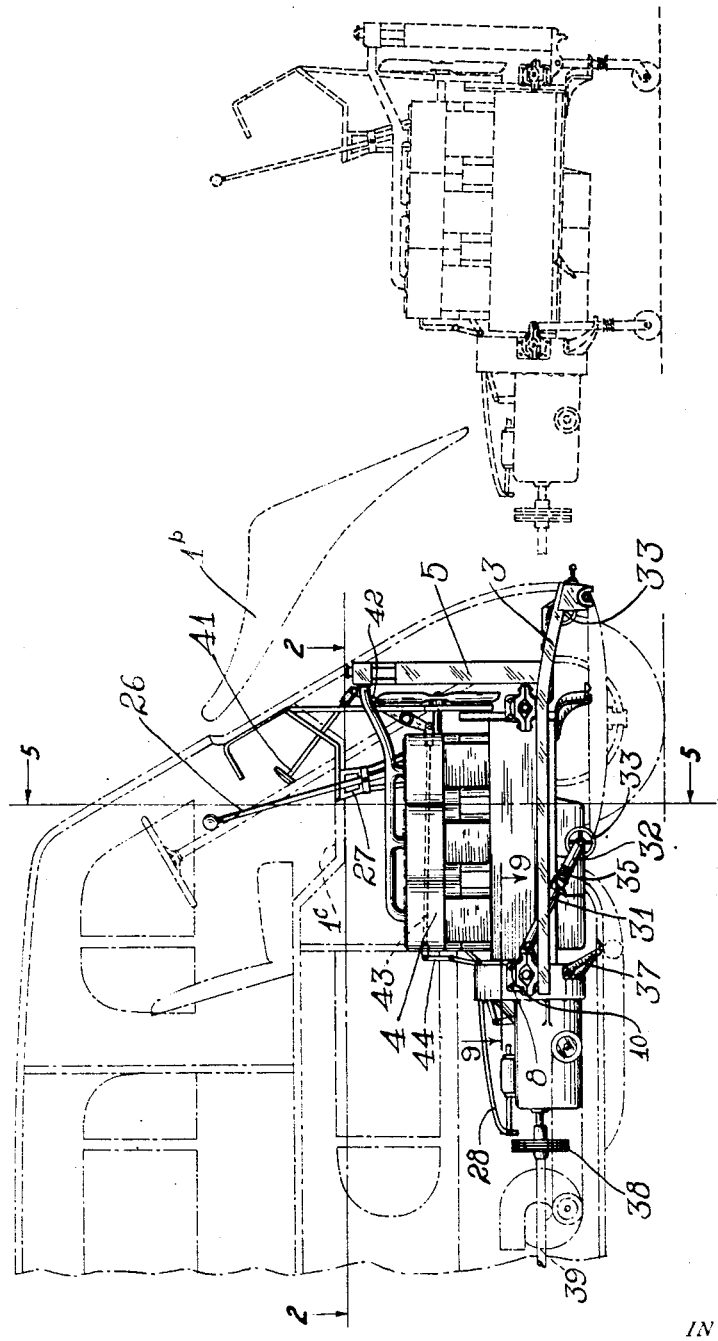

INVENTOR
DWIGHT E. AUSTIN
BY A. B. Bowman
ATTORNEY

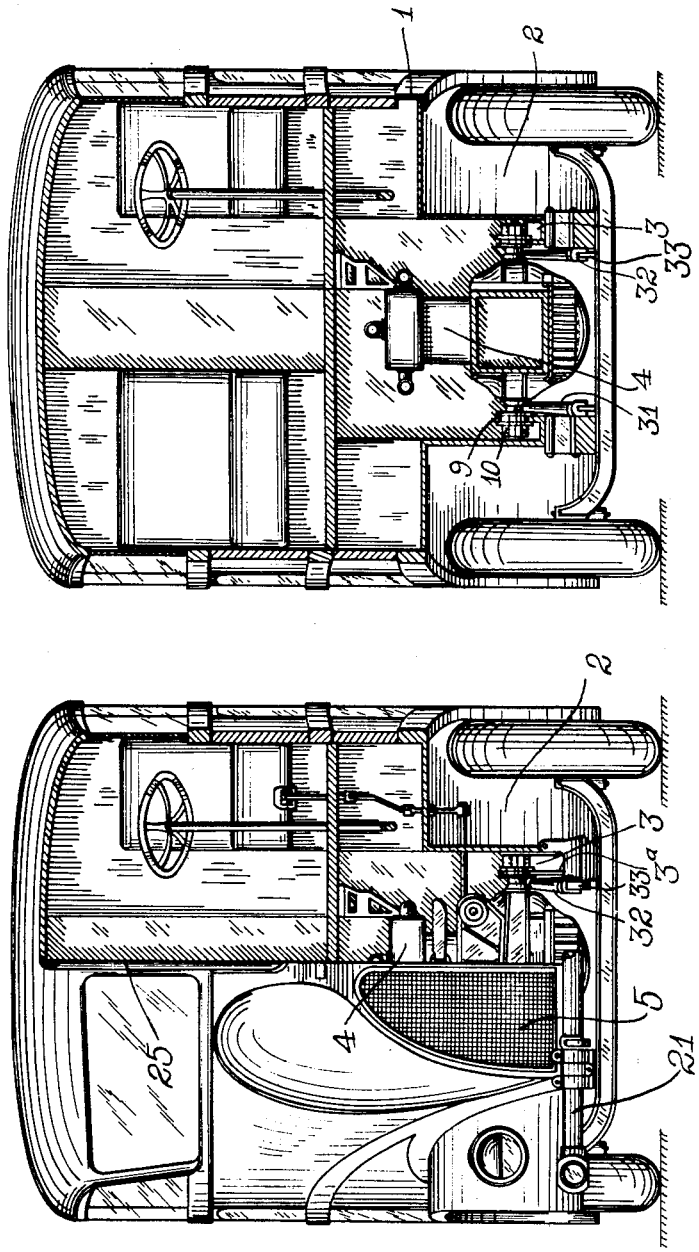

Jan. 10, 1933.  D. E. AUSTIN  1,893,609
DEMOUNTABLE MOTOR CONSTRUCTION FOR AUTOMOBILES
Filed Jan. 14, 1930   4 Sheets-Sheet 4
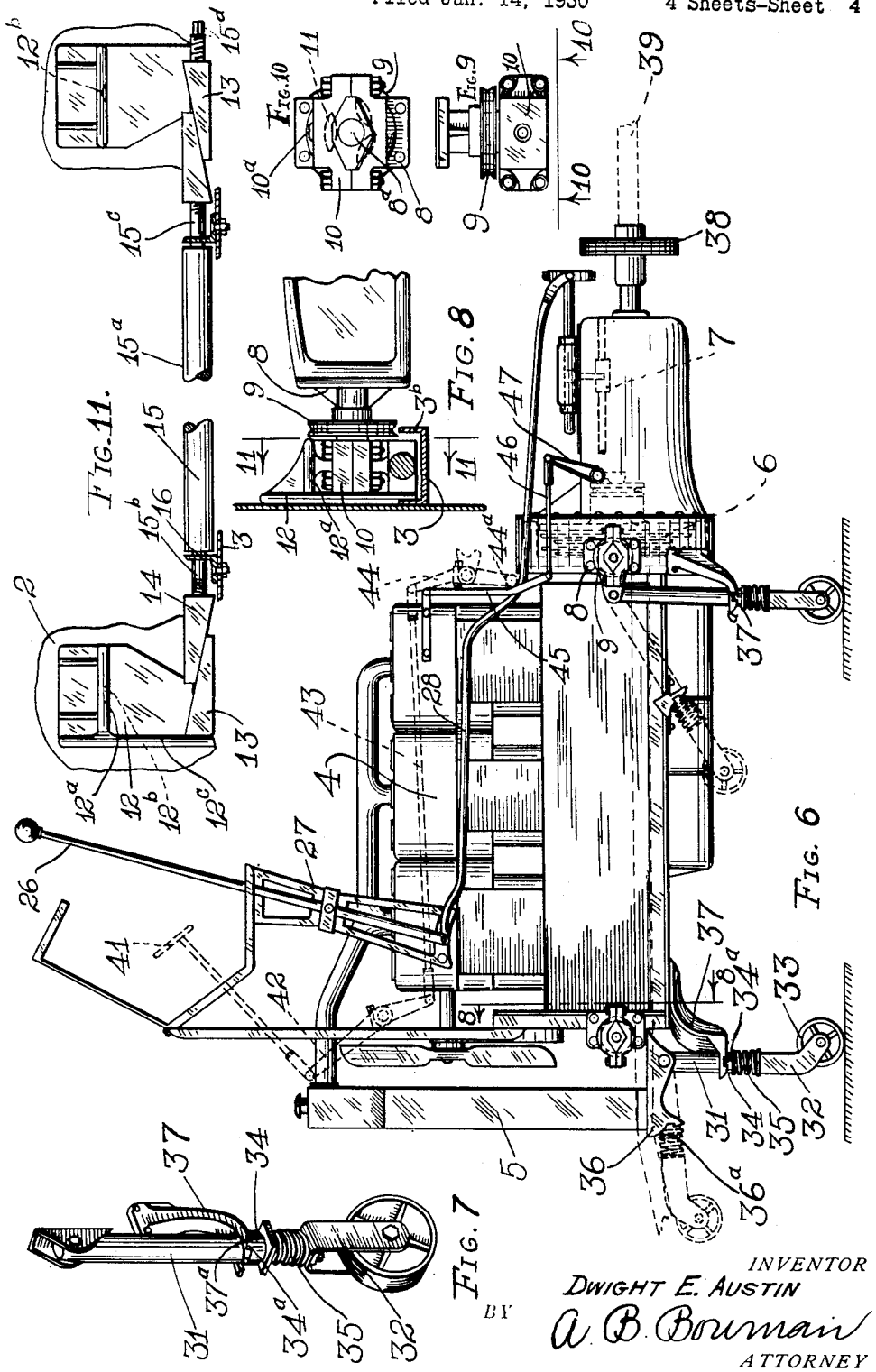
INVENTOR
DWIGHT E. AUSTIN
BY A. B. Bowman
ATTORNEY Patented Jan. 10, 1933

1,893,609

UNITED STATES PATENT OFFICE

DWIGHT E. AUSTIN, OF LOS ANGELES, CALIFORNIA

DEMOUNTABLE MOTOR CONSTRUCTION FOR AUTOMOBILES

Application filed January 14, 1930. Serial No. 420,644.

My invention relates to demountable motor construction for automobiles, and more particularly to the larger types of automobiles, such as automobile stages, trucks, and the like.

The objects of this invention are: first, to provide a construction of this class whereby a power plant may be dismounted and disconnected from a vehicle and another substituted with a minimum of time and effort, as well as a minimum amount of equipment and labor; second, to provide a construction of this class in which the power plant and parts connected thereto, as well as demountable therewith, form no part of the vehicle chassis, frame or body, and a construction in which the chassis, frame or body is not weakened by the dismounting of the power plant and associated parts; third, to provide a power plant and engine bearers whereby the engine may be readily rolled into position from one end or side of the vehicle through an opening in such side or end, and whereby the engine may be rolled into position on said engine bearers extending to the outer end of the opening; fourth, to provide a construction of the class mentioned in which the engine bearers are inclined downwardly at their outer ends so as to form inclined tracks by which the power plant may be easily raised and rolled into position at a higher elevation; fifth, to provide a power plant for a construction of this class which is provided with a separate under carriage for supporting the power plant on the ground or on the floor when the engine is dismounted and removed from the vehicle frame or chassis, said under carriage being so mounted that the same is folded upwardly in an out-of-the-way position when the power plant is mounted on the vehicle frame and readily unfolded or folded downwardly when dismounted from the vehicle frame; sixth, to provide novel means for securing the power plant in position on the vehicle frame, and such means whereby the power plant may be secured in position by a minimum of effort, manipulation and adjustment; seventh, to provide means whereby the power plant is simultaneously raised from the supporting tracks or engine bearers and secured in position on the engine frame; eighth, to provide a construction of this class in which the radiator, differential mechanism and clutch mechanism are removable with the engine and remain intact so that primarily only one main connection is required between the whole removable unit and the vehicle besides the actual securing of the power plant in position, and such one connection is the connection of the engine with the propeller shaft or drive shaft; ninth, to provide a construction of this class in which the gear shift lever is mounted on the power plant at the forward end thereof and is removable therewith; tenth, to provide a construction of this class in which the clutch pedal is mounted on the vehicle body or frame and is operatively connected to the clutch mechanism on the power plant by a mere physical contact and without positive connecting means; eleventh, to provide novel yieldable means for supporting the power plant on the vehicle chassis, frame or body; and, twelfth, to provide as a whole a novel demountable motor construction for automobiles, and one which as a whole is simple and economical of construction, durable, which may be easily installed and dismounted without skilled labor, and which will not readily get out of order.

Figure 2:
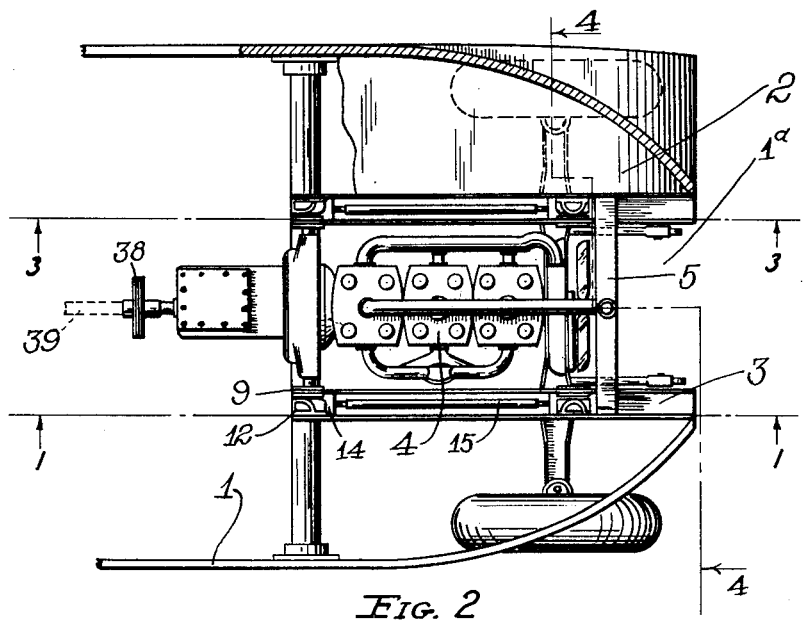
Figure 3:
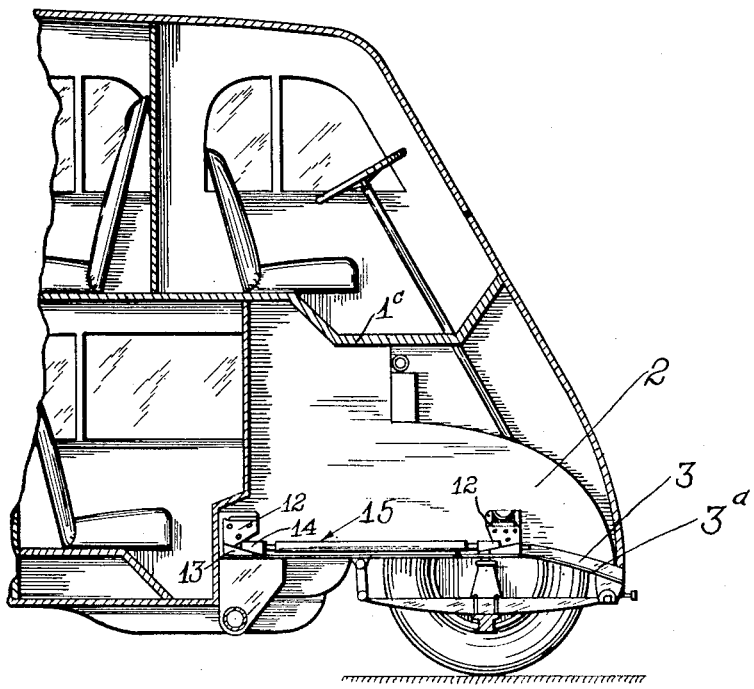

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a phantom view of an automobile stage with a removable front panel, showing one form of my demountable motor construction in connection therewith, taken at 1—1 of Fig. 2, and showing by dotted lines the whole power plant removed from the forward end thereof; Fig. 2 is a skeleton top view of the forward end of the automobile chassis, or frame, or stage body with the demountable power plant in position thereon with the view taken at 2—2 of Fig. 1; Fig. 3 is a longitudinal sectional view thereof taken through 3—3 of Fig. 2, but with the power plant removed; Fig. 4 is a partial sectional and partial elevational view of the automobile stage incorporating my invention with the view taken at 4—4 of Fig. 2; Fig. 5 is a sectional elevational view thereof taken at 5—5 of Fig. 1; Fig. 6 is an enlarged elevational view of the power plant removed from the vehicle and supported on its own under carriage, the under carriage being shown by dotted lines in its upwardly shifted position, the drive shaft connection, the engine bearers and the clutch pedal and associated levers being also shown by dotted lines; Fig. 7 is an enlarged perspective view of one of the members of the under carriage; Fig. 8 is a fragmentary sectional view taken through 8—8 of Fig. 6, showing the supporting brackets, rollers, and yieldable means for supporting the power plant; Fig. 9 is a top view thereof taken at 9—9 of Fig. 1; Fig. 10 is a side view thereof taken at 10—10 of Fig. 9; and, Fig. 11 is an enlarged fragmentary and sectional view of the power plant securing means and taken at 11—11 of Fig. 8.

Like characters of reference refer to similar parts and portions throughout the views of the drawings.

In the accompanying illustration, the vehicle shown is an automobile stage with the power plant at the forward end. The chassis or frame of the vehicle, designated generally by the numeral 1, is provided at its forward end with an opening 1a which extends thereinto from its forward end at the median line of the vehicle. At the lower portions of the walls 2 forming the opposite lateral sides of the opening are mounted tracks 3 which are in the form of channels with one of the flanges against the wall members and the other flange inwardly therefrom. The greater and inner portions of the tracks are horizontal but are inclined downwardly at their forward ends, as indicated by 3a. On these tracks the power plant is shifted or rolled into place.

The term power plant as I have used the same in this specification designates generally the internal combustion engine or motor 4, the radiator 5, the clutch 6 and the transmission mechanism 7. All of these members are mounted on or within a unitary support or engine frame and housing and are dismounted simultaneously from the vehicle frame and also mounted simultaneously thereon as a unit.

At the opposite sides of the motor housing are provided brackets 8 on which are mounted horizontally outwardly extending studs or arbors 8a. On these arbors are mounted flanged wheels 9 which are adapted to ride on the inner flanges 3b of the tracks 3. At the outer ends of the arbors are mounted boxes 10 in which are positioned rubber ball members 11 which form shock absorbing elements resiliently mounting the arbors on the boxes 10. These shock absorbing boxes are rigidly supported within the opening 1a of the vehicle frame and on the side walls 2 thereof. The means for securing the power plant in position is shown best in Figs. 3 and 11. The securing means consists essentially of brackets 12, inclined members 13, wedges 14, screws 15 screwably connected to the wedges 14, and brackets 16 on which the screws 15 are rotatably mounted within the channel shaped tracks 3. The brackets 12 are secured to the wall members 2 above the tracks 3 and at the opposite ends of their horizontal portions, as shown best in Fig. 3. The inclined members 13 are also secured to the side wall members 2 and may be secured directly to the brackets 12, as shown in Fig. 11. The upper surfaces of the inclined members 13 are inclined downwardly toward each other at the opposite sides of the median line of the vehicle. The wedges 14 conform with the inclined members 13 and are inclined at their under sides and rest with said inclined surfaces on the upper inclined surfaces of the inclined members. The screw 15 consists preferably of a heavy intermediate portion 15a which is reduced at its opposite ends forming the screw portions 15b and 15c which are provided with threads of opposite hand. These screw portions extend into the adjacent sides of the wedges. The screw portion 15c may extend through the wedge 14 and through the forward inclined member 13 and may be provided at its forward end with a polygonally shaped portion 15d which may be turned with a wrench. The initial adjustment may be performed by the portion 15d for spreading the wedge members and raising the same. The final adjustment may be made by directly engaging the heavier portion 15a intermediate the screw portions.

When the power plant is rolled into place with the flanged wheels 9 on the tracks 3, the shock absorbing boxes 10 are positioned over the wedges 14 and directly under ledges 12a on the brackets 12. At the under sides of these ledges are provided recesses 12b which are adapted to receive corresponding lugs 10a at the upper sides of the boxes 10a. The brackets 12 positioned inwardly from the forward end of the vehicle are also provided with flanges 12c which extend vertically at the inner portions of the brackets and serve as stops for the inward movement and position of the power plant. When the innermost boxes 10 engage these stops 12b, the screws are rotated which spread the wedges, raise the same, engage the under sides of the boxes 10 and raise said boxes and the power plant until said boxes engage the under sides of the ledges 12a and the lugs on the boxes enter the recesses 12b. Thus the power plant is raised from the track and is secured rigidly to the vehicle frame, chassis, or body.

In order to permit the dismounting of the power plant, a front panel 1b, shown best in Fig. 1, is removed. A heavy bumper 21, normally secured at the front end of the vehicle in front of the opening 1a, is also removed. The power plant, after the wedges 14 are withdrawn and the wheels 9 supported on the tracks, may be drawn forwardly together with the exhaust pipe 25, which in this instance extends upwardly through the removable hood 1b and in front of the front portion of the vehicle body at the median line thereof, as shown in Fig. 4. The gear shift lever 26 is also withdrawn from the power plant.

In order to facilitate the handling of the power plant when dismounting the same and when the same is supported on the ground or floor and also when mounting the same on the vehicle, I have provided under carriage means which in this instance forms a component part of the power plant. The under carriage means illustrated consists of four casters which consist of pivoted shanks 31 which are pivoted at their upper ends on the engine frame, yokes 32 mounted at the ends of the shanks 31, wheels 33 mounted on the yokes, locking collars 34 reciprocally mounted on the shanks 31, and compression springs 35 mounted on the shanks between the yokes 32 and the collars 34. On the engine frame are mounted brackets 36 which are provided with notches 36a which notches are adapted to receive corresponding lugs 34a at the normally upper sides of the collars 34 when the casters are shifted in their raised or non-supporting positions, as shown by dotted lines in Fig. 6. On the motor frame are also mounted a plurality of downwardly extending brackets 37 which are provided at their under sides with notches 37a which are adapted to receive the lugs 34a of the collars 34 of the casters when the casters are shifted in their downward and supporting positions, as shown by solid lines in Fig. 6.

When the power plant is secured in position, the only connection required operatively to connect the power plant to the propelling mechanism of the vehicle and other portions thereof, is to connect the coupling or universal joint 38 to the drive shaft 39, as shown by dotted lines in Fig. 6, and also to make the necessary fuel, oil, and electrical connections (not shown) to the vehicle.

The gear shift lever 26 is pivotally mounted on a frame 27 supported on the engine frame, the upper portion of the frame 27 forming a portion of the floor of the driver's compartment 1c in Fig. 1. This gear shift lever is pivotally mounted intermediate its ends on the frame 27 and is pivotally connected at its lower end by a bent rod 28 to the transmission mechanism 7, as shown in Fig. 6, it being noted that the engine is positioned below the driver's compartment and that the gear shift lever is mounted at the forward end of the power plant.

On the body of the vehicle is mounted a clutch pedal 41 which extends through the floor 1c of the vehicle. This clutch pedal is pivotally connected to an arm 42 which is pivotally mounted intermediate ites ends and is pivotally connected at its opposite end by a rod 43 to one end of another rocker arm 44. The opposite end 44a of the rocker arm 44 extends downwardly. When the power plant is shifted into position in the vehicle frame, said lower end, which is preferably provided with a roller, is engaged by an arm 45 which is pivotally mounted at its upper end on the engine and is pivotally connected at its lower end by a rod 46 to a clutch lever 47. As the clutch pedal 41 is depressed, the lower end of the rocker arm 44 engages the arm 45 intermediate its ends and shifts the same forwardly about its pivotal axis disengaging the clutch. Thus, it will be seen that no positive connection is required in connecting the clutch pedal, permanently mounted on the vehicle body, to the clutch mechanism permanently mounted on the power plant.

Though I have shown and described a particular construction, combination and arrangement of parts and portions of my demountable motor or power plant construction, and a particular application of such a construction to automobile stages, I do not wish to be limited to this particular construction, combination and arrangement, nor to the application disclosed, but desire to include in the scope of my invention the construction, combination and arrangement substantially as set forth in the appended claims.

Having thus described my invention, what I claim as new and desire to secure by Letters Patent is:

1. In a structure of the class described, a vehicle frame having spaced apart tracks, and brackets positioned above the tracks, a motor having supporting means at its opposite sides adapted to ride upon said tracks, and means in connection with the frame and said supporting means for raising the supporting means above the tracks when the motor is in position, said supporting means, when raised, positively engaging the brackets for positively locking the supporting means and said motor to said brackets and with respect to said frame.

2. In a structure of the class described, a vehicle frame having spaced apart tracks, and brackets positioned above the tracks, said brackets having recesses at their under sides, a motor having supporting means at its opposite sides adapted to ride upon said tracks, and means in connection with the frame and said supporting means for raising the supporting means above the tracks when the motor is in position, said supporting means having at the upper sides thereof upwardly projecting lugs adapted to enter the recesses in the brackets when the motor is in position and the supporting means raised above the tracks.

3. In a structure of the class described, a vehicle frame having spaced apart tracks and means positioned above the tracks for securing a motor, a motor having supporting brackets at its opposite sides, supporting means yieldably and resiliently secured to the ends of the brackets, said brackets being adapted to support said motor on said tracks when shifting the motor into operative position on the vehicle, and means for raising the motor clear of the tracks for securing the supporting means to the securing means on the frame.

4. In a structure of the class described, a vehicle frame having spaced apart tracks and means positioned above the tracks for securing a motor, a motor having supporting brackets at its opposite sides, rollers mounted on the brackets for supporting the motor on the tracks and for shifting the same into position on the vehicle frame, shock absorbing boxes mounted on the ends of the brackets and yieldably and resiliently with respect thereto, said boxes having means for positively engaging the securing means on the frame, and means for raising the wheels above the tracks and forcing the shock absorbing boxes into positive and locking relation with the securing means on the frame.

5. In a structure of the class described, a vehicle frame having at its opposite lateral sides pairs of fixed inclined members positioned apart longitudinally with respect to the longitudinal axis of the vehicle, pairs of wedges at each side of the vehicle, one wedge being positioned in cooperative relation with one of the inclined members, a screw for each pair of wedges for simultaneously adjusting the wedges of each pair for raising the same with respect to the inclined members, securing brackets on the frame above each of the wedges, and a motor having laterally extended brackets adapted to be positioned with the ends of the brackets above the wedges for raising the brackets into securing engagement with the brackets on the frame.

6. In a structure of the class described, a vehicle frame having a clutch shifting means mounted thereon and forming a part thereof, a power plant unit removably mounted on the frame, said power plant unit comprising a motor, a clutch, and a clutch shifting lever, said power plant unit being shiftable into position upon said frame, said clutch lever, when said power plant is shifted into position, being shiftable into free engagement with the front side of the clutch shifting means.

In testimony whereof, I have hereunto set my hand at Los Angeles, California this 6th day of January 1930.

DWIGHT E. AUSTIN.